US011586278B2

(12) United States Patent
Kondoh et al.

(10) Patent No.: US 11,586,278 B2
(45) Date of Patent: Feb. 21, 2023

(54) ANIMATION PRODUCTION SYSTEM

(71) Applicant: AniCast RM Inc., Minato-ku (JP)

(72) Inventors: Yoshihito Kondoh, Chuo-ku (JP);
Masato Murohashi, Tokyo (JP)

(73) Assignee: AniCast RM Inc., Minato-ku (JP)

( * ) Notice: Subject to any disclaimer, the term of this patent is extended or adjusted under 35 U.S.C. 154(b) by 0 days.

(21) Appl. No.: 17/007,998

(22) Filed: Aug. 31, 2020

(65) Prior Publication Data
US 2022/0035446 A1    Feb. 3, 2022

(30) Foreign Application Priority Data

Jul. 29, 2020   (JP) .............................. JP2020-128297

(51) Int. Cl.
*G06F 3/01* (2006.01)
*G06T 13/80* (2011.01)

(52) U.S. Cl.
CPC .............. *G06F 3/012* (2013.01); *G06T 13/80* (2013.01)

(58) Field of Classification Search
CPC ........ G06F 3/012; G06F 3/011; G06F 3/0325; G06F 3/0346; G06F 3/165; G06T 13/18; G06T 13/40; A63F 13/25; A63F 13/56; A63F 13/60; A63F 2300/6607
See application file for complete search history.

(56) References Cited

U.S. PATENT DOCUMENTS

| | | | | |
|---|---|---|---|---|
| 8,493,335 B2 * | 7/2013 | Shinkai | ................... | G06F 3/041 |
| | | | | 340/407.1 |
| 8,964,052 B1 * | 2/2015 | Wooley | ................... | G06T 13/20 |
| | | | | 348/211.3 |
| 10,497,182 B2 * | 12/2019 | Sheftel | ................... | G06T 19/006 |
| 10,551,993 B1 * | 2/2020 | Sanocki | ................... | G06F 3/017 |
| 11,321,898 B2 * | 5/2022 | Kondoh | ................... | G06F 3/011 |
| 2009/0096755 A1 * | 4/2009 | Shinkai | ................... | G11B 27/34 |
| | | | | 345/173 |
| 2016/0364198 A1 * | 12/2016 | Song | ..................... | G06F 3/1454 |
| 2018/0246328 A1 * | 8/2018 | Song | ..................... | G06F 16/176 |
| 2018/0326307 A1 * | 11/2018 | Watanabe | ............. | A63F 13/426 |
| 2019/0001221 A1 * | 1/2019 | Park | ..................... | A63F 13/5255 |
| 2019/0102949 A1 * | 4/2019 | Sheftel | ................... | H04N 5/265 |

FOREIGN PATENT DOCUMENTS

JP      2017146651 A      8/2017

* cited by examiner

*Primary Examiner* — Mihir K Rayan

(57) ABSTRACT

The principal invention for solving the above-described problem is an animation production method that provides a virtual space in which a given object is placed, the method comprising: detecting an operation of a user equipped with a head mounted display; controlling a movement of an object based on the detected operation of the user; shooting the movement of the object; storing an action data relating to the movement of the shot object in a first track; and storing audio from the user in a second track.

2 Claims, 9 Drawing Sheets

ANIMATION PRODUCTION SYSTEM

TECHNICAL FIELD

The present invention relates to an animation production system.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

No attempt was made to capture animations in the virtual space.

The present invention has been made in view of such a background, and is intended to provide a technology capable of capturing animations in a virtual space.

Solution to Problem

The principal invention for solving the above-described problem is an animation production method that provides a virtual space in which a given object is placed, the method comprising: detecting an operation of a user equipped with a head mounted display; controlling a movement of an object based on the detected operation of the user; shooting the movement of the object; storing an action data relating to the movement of the shot object in a first track; and storing audio from the user in a second track.

The other problems disclosed in the present application and the method for solving them are clarified in the sections and drawings of the embodiments of the invention.

Advantageous Effects of Invention

According to the present invention, animations can be captured in a virtual space.

BRIEF DESCRIPTION OF DRAWINGS

FIG. 9($b$) is a diagram illustrating a track generation according to an embodiment of the present invention.

DESCRIPTION OF EMBODIMENTS

Figure 1:
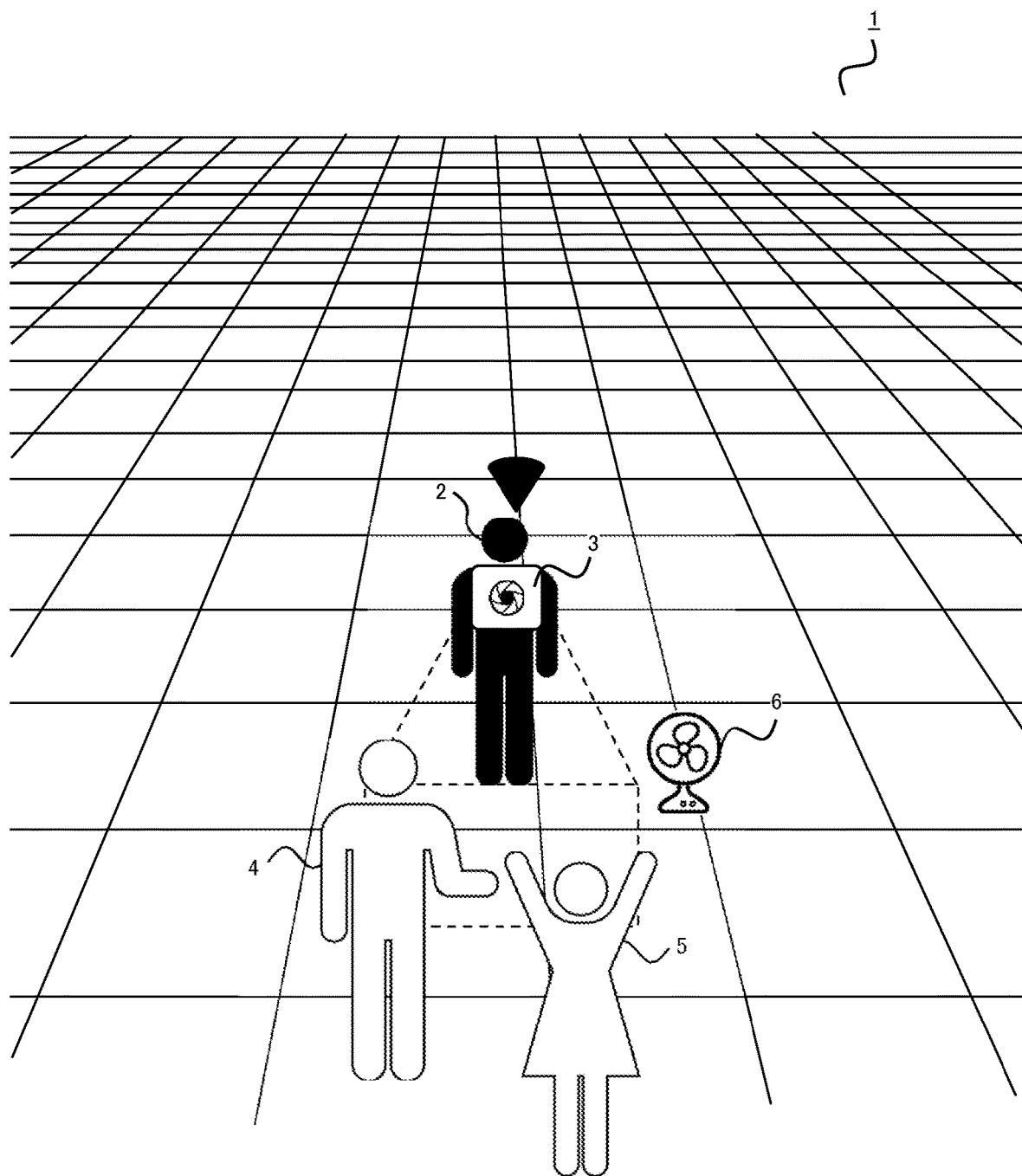
FIG. 1 is a diagram illustrating an example of a virtual space displayed on a head mount display (HMD) mounted by a user in an animation production system of the present embodiment.

The contents of embodiments of the present invention will be described with reference. An animation production method according to an embodiment of the present invention has the following configuration.

[Item 1]

An animation production method that provides a virtual space in which a given object is placed, the method comprising:

detecting an operation of a user equipped with a head mounted display;

controlling a movement of an object based on the detected operation of the user;

shooting the movement of the object;

storing an action data relating to the movement of the shot object in a first track; and storing audio from the user in a second track.

[Item 2]

The method further comprising sharing the first track or the second track at a plurality of user terminals.

A specific example of an animation production system according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

<Overview>

FIG. 1 is a diagram illustrating an example of a virtual space displayed on a head mount display (HMD) mounted by a user in an animation production system of the present embodiment. In the animation production system of the present embodiment, a character 4 and a camera 3 are disposed in the virtual space 1, and a character 4 is shot using the camera 3. In the virtual space 1, the photographer 2 is disposed, and the camera 3 is virtually operated by the photographer 2. In the animation production system of the present embodiment, as shown in FIG. 1, a user makes an animation by placing a character 4 and a camera 3 while viewing the virtual space 1 from a bird's perspective with a TPV (Third Person's View), taking a character 4 with an FPV (First Person View; first person support) as a photographer 2, and performing a character 4 with an FPV. In the virtual space 1, a plurality of characters (in the example shown in FIG. 1, a character 4 and a character 5) can be disposed, and the user can perform the performance while possessing a character 4 and a character 5, respectively. That is, in the animation production system of the present embodiment, one can play a number of roles (roles). In addition, since the camera 2 can be virtually operated as the photographer 2, natural camera work can be realized and the representation of the movie to be shot can be enriched.

Figure 2:
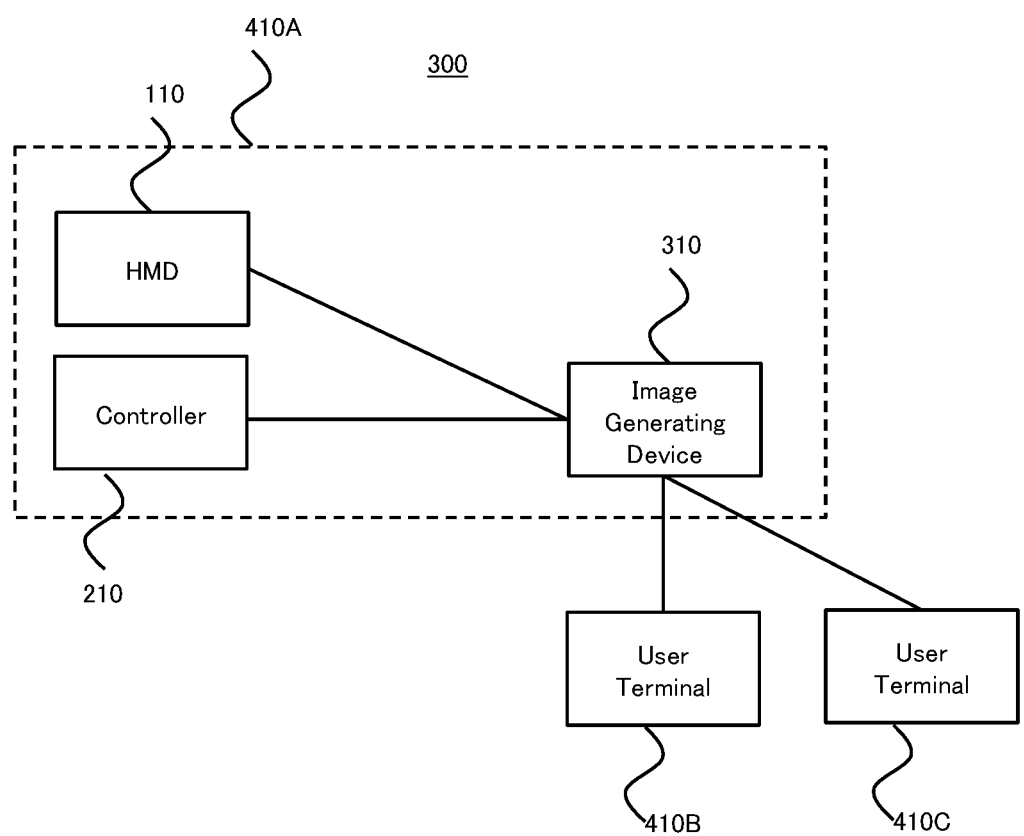
FIG. 2 is a diagram illustrating an example of the overall configuration of an animation production system 300 according to an embodiment of the present invention.

<General Configuration>
FIG. 2 is a diagram illustrating an example of the overall configuration of an animation production system 300 according to an embodiment of the present invention. The animation production system 300 may comprise, for example, a user terminal 410A comprising an HMD 110, a controller 210, and an image generator 310 that functions as a host computer. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function. The user terminal 410A may also connect other user terminals 410B, 410C via a network or the like. Other user terminals 410B, 410C may include an HMD and/or controller as well as a user terminal 410A and may include at least a computer, a game machine, a portable communication terminal, or any other device having a computational processing function.

Figure 3:
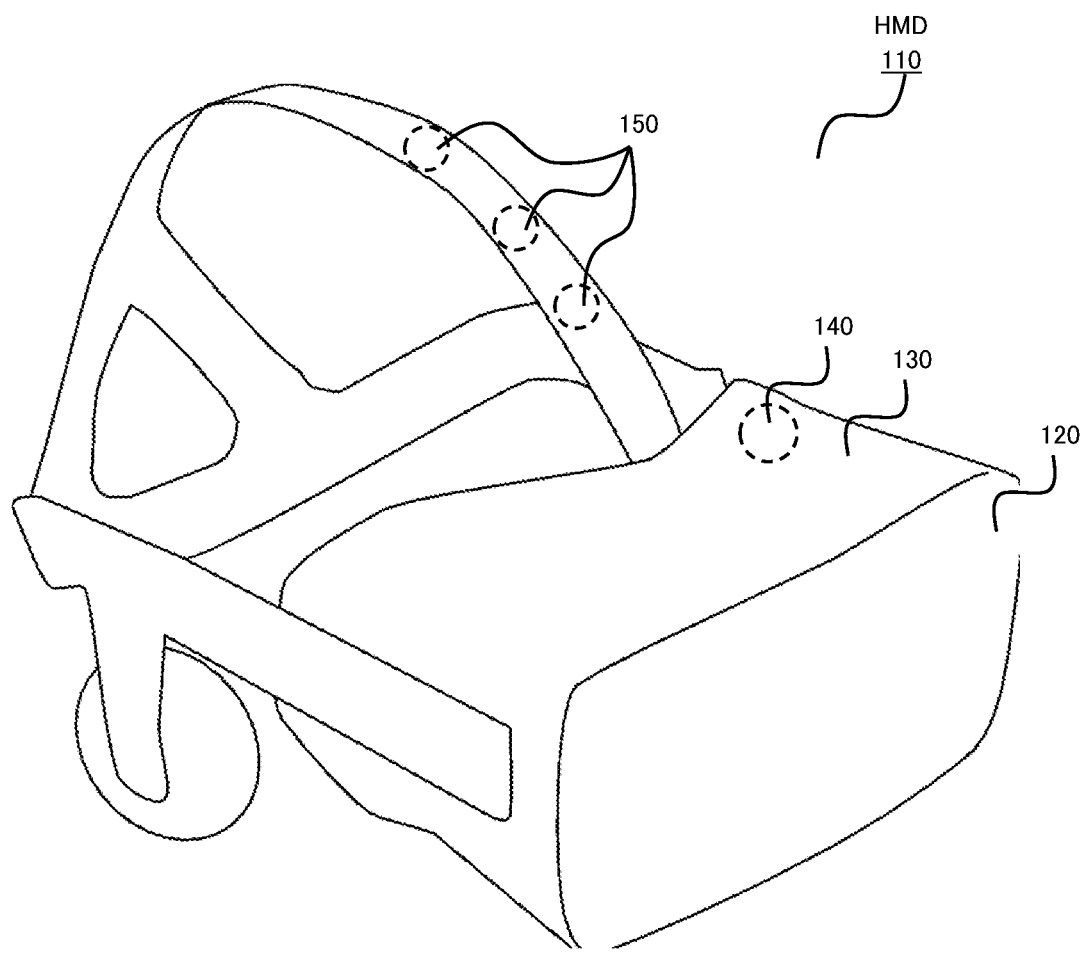
FIG. 3 shows a schematic view of the appearance of a head mount display (hereinafter referred to as an HMD) 110 according to the present embodiment.
Figure 5:
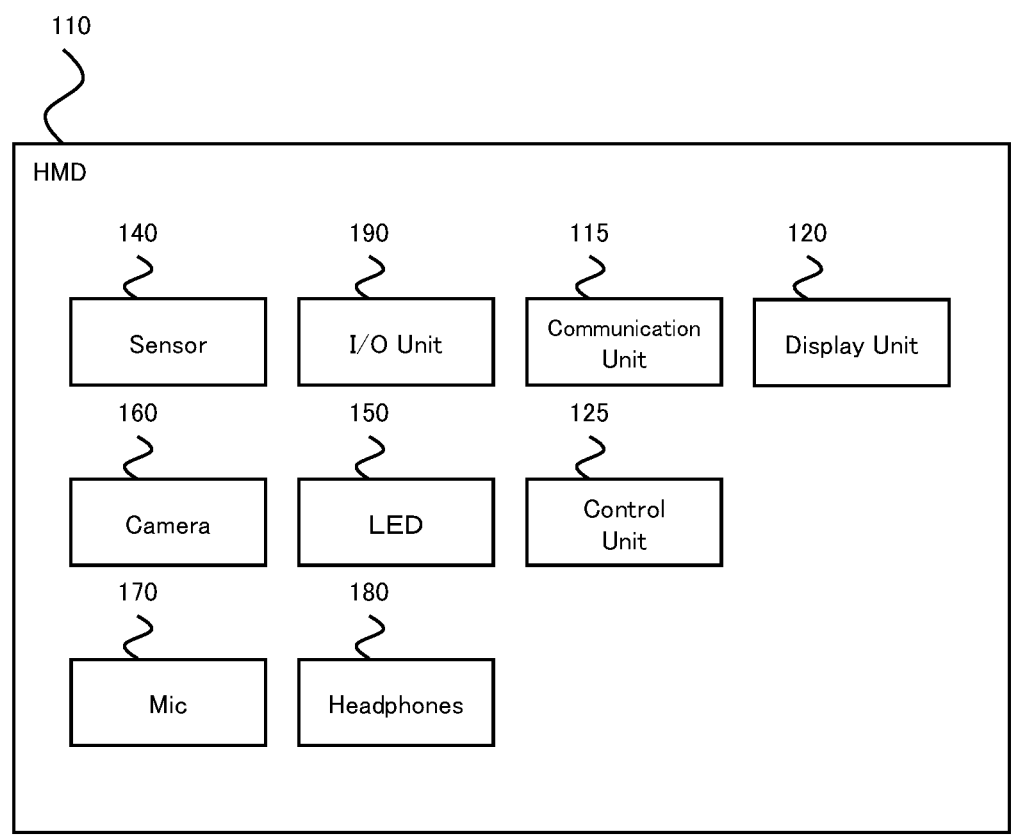
FIG. 5 shows a functional configuration diagram of the HMD 110 according to the present embodiment.

<HMD 110>
FIG. 3 shows a schematic view of the appearance of a head mount display (hereinafter referred to as HMD) 110 according to the present embodiment. FIG. 5 shows a functional configuration diagram of the HMD 110 according to the present embodiment. The HMD 110 is mounted on the user's head and includes a display panel 120 for placement in front of the user's left and right eyes. Although an optically transmissive and non-transmissive display is contemplated as the display panel, this embodiment illustrates a non-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. The sensor 140 may comprise, for example, a magnetic sensor, an acceleration sensor, or a gyro sensor, or a combination thereof, to detect actions such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

Figure 4:
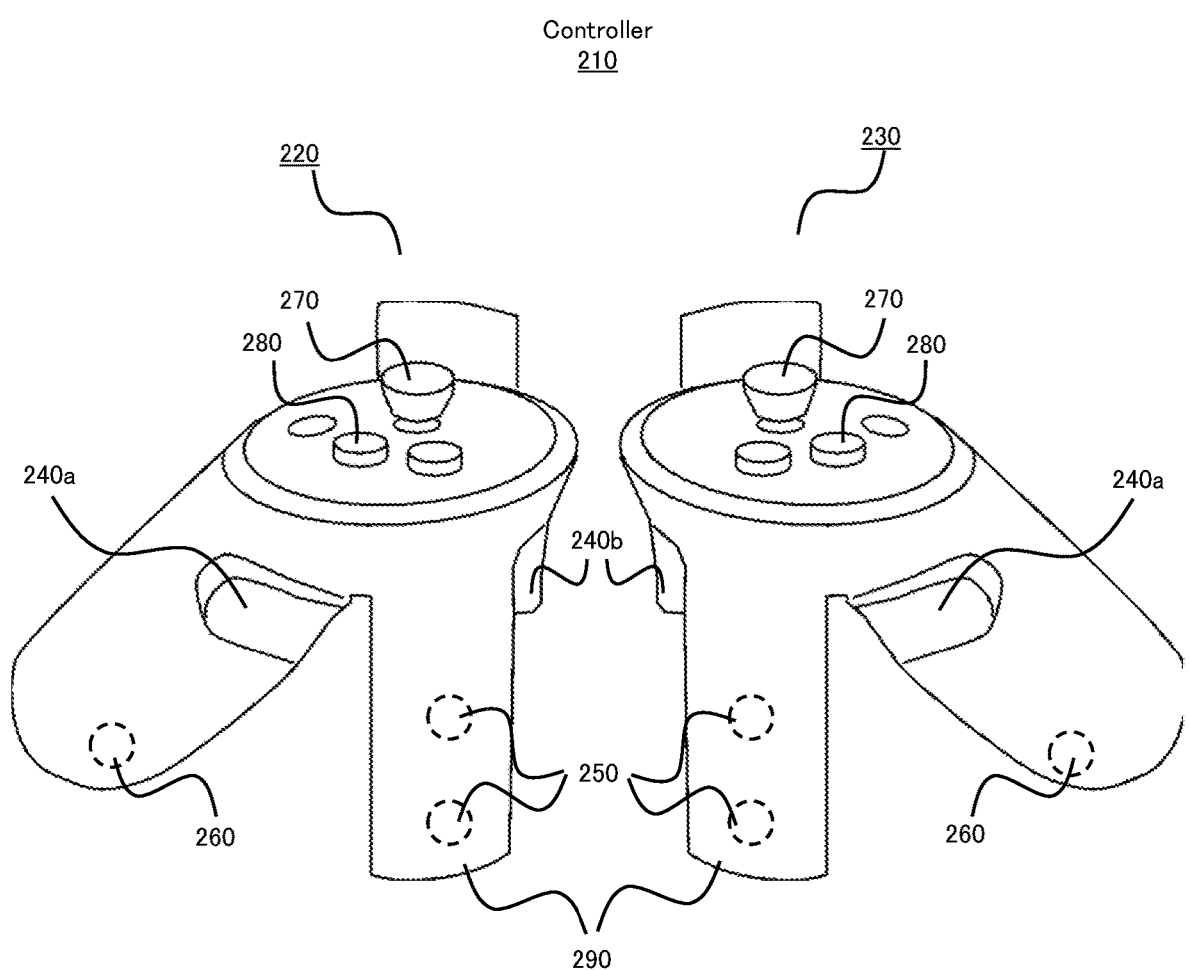
FIG. 4 shows a schematic view of the outside of the controller 210 according to the present embodiment.
Figure 6:
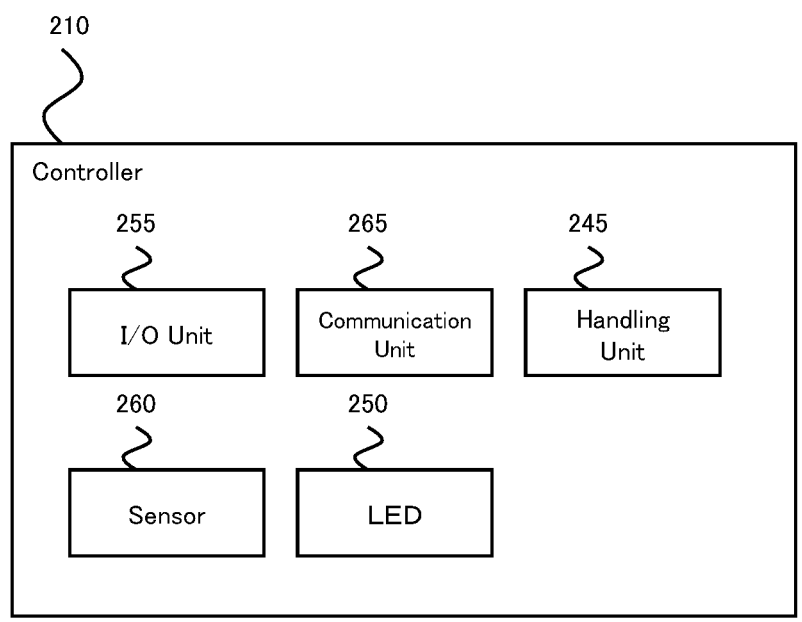
FIG. 6 shows a functional configuration diagram of the controller 210 according to the present embodiment.

<Controller 210>
FIG. 4 shows a schematic view of the appearance of the controller 210 according to the present embodiment. FIG. 6 shows a functional configuration diagram of the controller 210 according to the present embodiment. The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect operations such as the orientation or tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the user's hand operation and attitude, pseudo-displaying and operating the user's hand in the virtual space.

Figure 7:
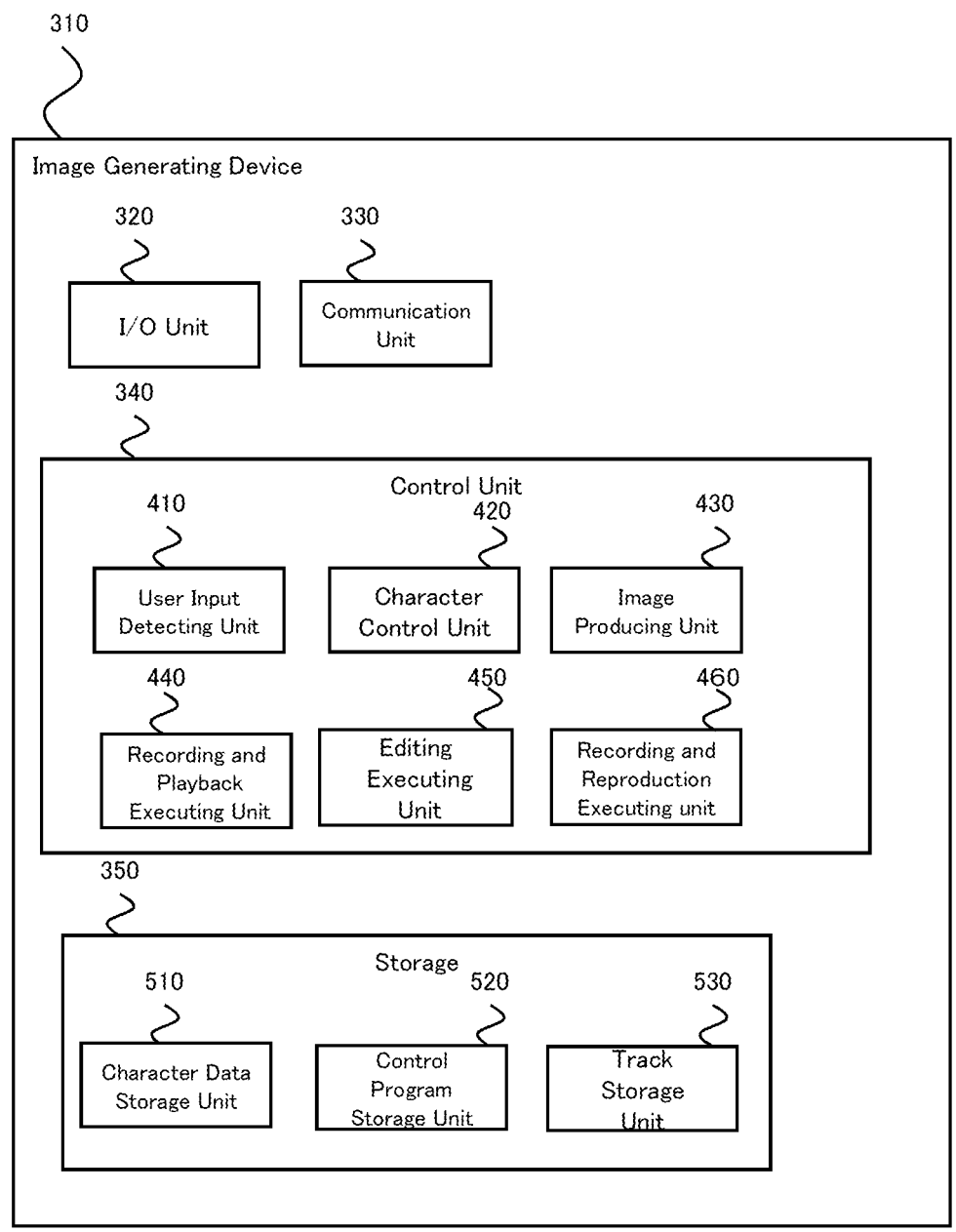
FIG. 7 shows a functional configuration diagram of an image producing device 310 according to the present embodiment.

<Image Generator 310>
FIG. 7 shows a functional configuration diagram of an image producing device 310 according to this embodiment. The image producing device 310 may use a device such as a PC, a game machine, or a portable communication terminal having a function for storing information on the user's head operation or the operation or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110 and/or the controller 210 regarding the operation of the user's head or the operation or operation of the controller is detected in the control unit 340 as input content including the operation of the user's position, line of sight, attitude, speech, operation, etc., through the I/O unit 320 and/or the communication unit 330. The control unit 350 executes a control program stored in the storage unit 350 according to the user's input content, and performs a process such as controlling the character and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the operation of the user's head, speech of the user, and operation of the controller, a character control unit 420 that executes a control program stored in the control program storage unit for a character stored in the character data storage unit 440 of the storage unit 350 in advance, and an image producing unit 430 that generates an image based on character control. Here, the control of the operation of the character is realized by converting information such as the direction, inclination, or manual operation of the user head detected through the HMD 110 or the controller 210 into the operation of each part of the bone structure created in accordance with the movement or restriction of the joints of the human body, and applying the operation of the bone structure to the previously stored character data by relating the bone structure. Further, the control unit 340 includes a recording and playback executing unit 440 for recording and playing back an image-generated character on a track, and an editing executing unit 450 for editing each track and generating the final content. Further, the controller 340 includes a recording and reproduction executing unit 460 for recording audio based on a user's speech.

The storage unit 350 includes a character data storage unit 510 for storing not only image data of a character but also information related to a character such as attributes of a character. The control program storage unit 520 stores a program for controlling the operation of a character or an expression in the virtual space. The storage unit 350 includes an action data composed of parameters for controlling the movement of a character in a moving image generated by the image producing unit 630 and a track storage unit 530 for storing motion data relating to a user's voice and/or lipsink.

Figure 8:
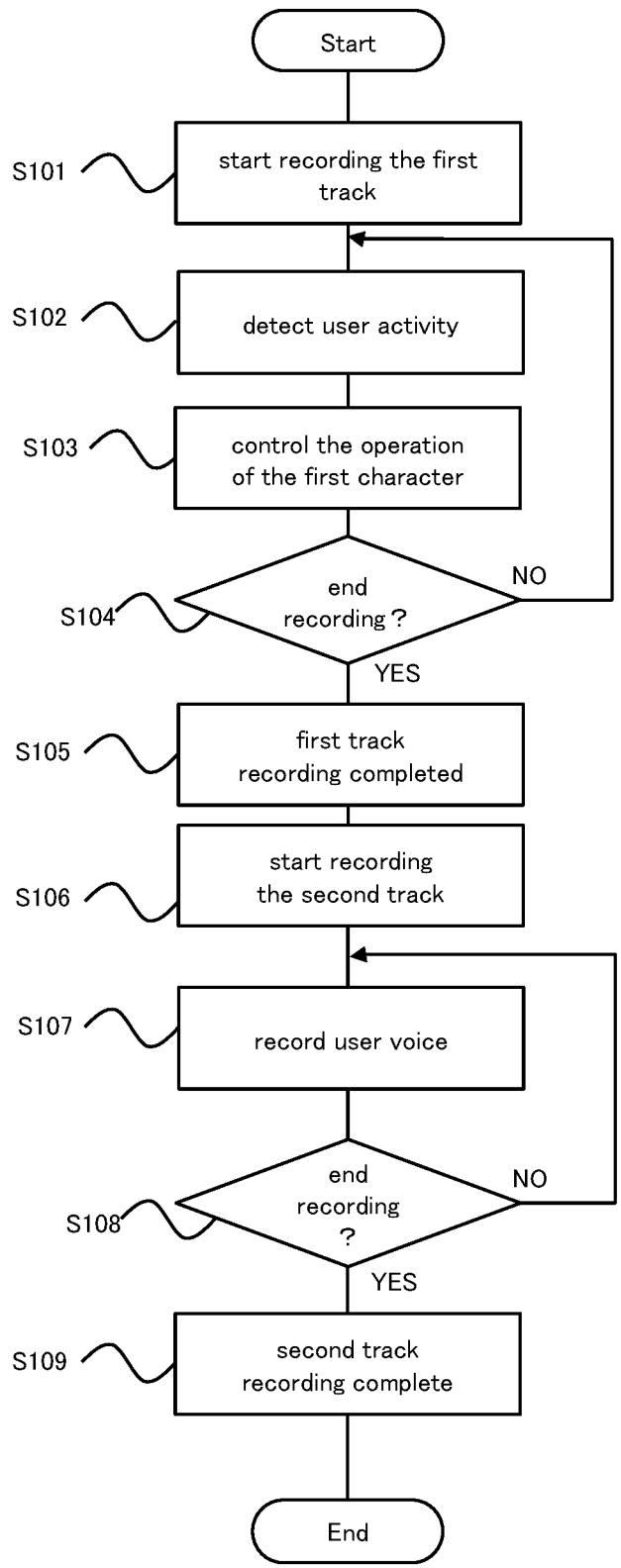
FIG. 8 is a flow chart illustrating an example of a track generation process according to an embodiment of the present invention.

FIG. 8 is a flowchart illustrating an example of a track generation process according to an embodiment of the present invention.

First, the recording and reproduction executing unit 440 of the control unit 340 of the image producing device 310 starts recording for storing action data of the moving image related to operation by the first character in the virtual space in the first track of the track storage unit 530 (S101). Here, the position of the camera where the character is to be shot and the viewpoint of the camera (e.g., FPV, TPV, etc.) can be set. For example, in the virtual space 1 illustrated in FIG. 1, the position where the camera man 2 is disposed and the angle of the camera 3 can be set with respect to the character 4 corresponding to the first character. The recording start operation may be indicated by a remote controller, such as controller 210, or may be indicated by other terminals. The operation may also be performed by a user who is equipped with an HMD 110 to manipulate the controller 210, to play a character, or by a user other than the user who performs the character. In addition, the recording process may be automatically started based on detecting an operation by a user who performs the character described below.

Subsequently, the user input detecting unit 410 of the control unit 340 detects information received from the HMD 110 and/or the controller 210 regarding the operation of the user's head, speech of the user, and operation or operation of the controller (S102). For example, when the user mounting the HMD 110 tilts the head, the sensor 140 provided in the HMD 110 detects the tilt and transmits information about the tilt to the image generating device 310. The image generating device 310 receives information about the operation of the user through the communication unit 330, and the user input detecting unit 410 detects the operation of the user's head based on the received information. Also, when a user performs a predetermined operation or operation, such as lifting the controller 210 or pressing a button, the sensor 260 provided in the controller detects the operation and/or operation and transmits information about the operation and/or operation to the image generating device 310 using the controller 210. The image producing device 310 receives information related to the user's controller operation and operation through the communication unit 330, and the user input detecting unit 410 detects the user's controller operation and operation based on the received information.

Figure 9A:
FIG. 9($a$) is a diagram illustrating a track generation according to an embodiment of the present invention.

Subsequently, the character control unit 420 of the control unit 340 controls the operation of the first character in the virtual space based on the operation of the detected user (S103). For example, based on the user detecting an operation to tilt the head, the character control unit 420 controls to tilt the head of the first character. Also, based on the fact that the user lifts the controller and detects pressing a predetermined button on the controller, the character control unit 420 controls something while extending the arm of the first character upward. In this manner, the character control unit 420 controls the first character to perform the corresponding operation each time the user input detecting unit 410 detects an operation by a user transmitted from the HMD 110 or the controller 210. Stores parameters related to the operation and/or operation detected by the user input detecting unit 410 in the first track of the track storage unit 530. Alternatively, the character may be controlled to perform a predetermined performance action without user input, and the action data relating to the predetermined performance action may be stored in a first track, as shown in FIG. 9(*a*), or both user action and action data relating to a predetermined operation may be stored.

Subsequently, the recording and reproduction executing unit 440 confirms whether or not the user receives the instruction to end the recording (S104), and when receiving the instruction to end the recording, completes the recording of the first track related to the first character (S105). The recording and reproduction executing unit 440 continues the recording process unless the user receives an instruction to end the recording. Here, the recording and reproduction executing unit 440 may perform the process of automatically completing the recording when the operation by the user acting as a character is no longer detected.

Figure 9B:
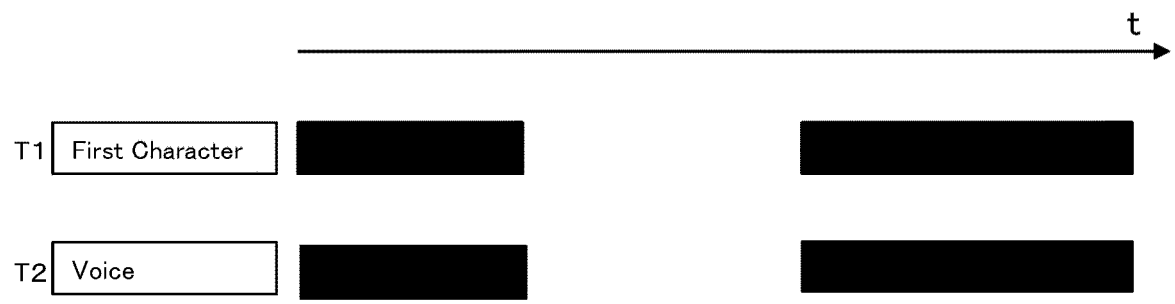

Subsequently, the recording execution unit 460 starts recording for storing in the second track of the track storage unit 530 (S106). Here, the audio to be recorded is assumed to have various uses, such as tentatively recording the lyrics of the character, recording the camera work and instruction on the appearance in accordance with the character operation realized by the stored action data. For example, in the virtual space 1 illustrated in FIG. 1, a camera viewpoint for a character 4 corresponding to the first character can be set so as to take a bird's eye view from a camera 3 to a TPV viewpoint, and the first track can be played back, and the second track can be recorded as shown in FIG. 9(b), while checking the operation of the character 4. The recording start operation may be indicated by a remote controller, such as controller 210, or may be indicated by other terminals. The operation may also be performed by a user who performs a character or by a user other than the user who performs the character. The recording process may also be initiated automatically based on the detection of speech by the user performing the character.

Subsequently, the recording and reproduction executing unit 460 of the control unit 340 detects the voice information pertaining to the speech of a user received from the HMD 110 or the microphone (not shown) through the user input detecting unit 410 and records the voice to the second track (S107). Here, the user may be the same user as the user performing the first character, or may be a different user. Alternatively, the voice input by the user can be received through a sound collecting means such as a microphone that is input to the input/output unit 320 of the image producing device 310.

Subsequently, the recording executing unit 460 confirms whether the user has received an instruction to terminate the recording (S108), and when receiving an instruction to terminate the recording, completes the recording of the second track (S109). The recording executing unit 460 continues the recording process unless the user receives an instruction to terminate the recording. Here, the recording execution unit 440 may perform a process of automatically completing the recording when the operation by the user acting as a character is no longer detected. It is also possible to execute the recording termination process at a predetermined time by activating a timer rather than accepting instructions from the user.

Although the procedure of the track generation process has been described with reference to FIG. 8, for processing of S107 to S109, motion data consisting of parameters relating to the corresponding lip sink (lip movement of the character) can be stored instead of or additionally adding the user's voice to the second track, based on the user's voice. When the motion data related to lip-sink is stored together with the recording, in S108 and S109, it is possible to stop storing the motion data when the voice of the user is no longer detected.

It is also possible to skip the first track recording of S101 to S106 to execute the recording process of S107 or later. The same applies to storing motion data related to lipsink.

The user may also transmit the first and second tracks to other user terminals such as voice actors (e.g., user terminals 410B or 410C of FIG. 2), and other users may further record character audio while referring to the audio of the temporarily recorded characters. In addition, when the other user is an editor, the camera angle of the first track or the behavior of the character may be edited while referring to the instruction content, such as the recorded appearance of the shared second track.

In addition, the animation production system according to the present embodiment can be used to produce the animation by a so-called agile method. In other words, it is possible to complete the scene by repeating the events in a short period of time, checking the finish, and taking the pictures again and recording them as needed. This makes it possible to produce animations quickly and flexibly while confirming the direction of production. Alternatively, only a portion of a scene that can be represented can be included in the track and the animation can be finished by stacking the tracks later. For example, the creation of a picture contest is omitted, and instead of a picture contest, a director, performer, or scenario writer can manipulate character 4 within virtual space 1 to record on a track and the performer can play while checking the recorded track. For example, it may be easy to retrieve and rectify a contradictory scene. In addition, various cuts can be made to the track in asynchronous audio and visual recordings, thereby facilitating scheduling management.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in this embodiment, while a character has been described as an example with respect to a track generation method and an editing method, the method disclosed in this embodiment may be applied to an object (vehicle, structure, article, etc.) comprising an action, including not only a character, but also a character.

For example, although the image producing device 310 has been described in this embodiment as separate from the HMD 110, the HMD 110 may include all or part of the configuration and functions provided by the image producing device 310.

EXPLANATION OF SYMBOLS 1 virtual space
2 cameraman
3 cameras
4 characters
5 characters
110 HMD
210 controller
310 Image Generator
410 User Terminals

The invention claimed is:

1. An animation production method that provides a virtual space in which a given character is placed, the method comprising:
  a first user terminal executing steps of:
  detecting an operation of a first user equipped with a head mounted display;
  controlling a movement of an character based on the detected operation of the first user;
  shooting the movement of the character;
  storing an action data relating to the movement of the shot character in a first track so that the action data is editable;
  recording a temporal voice of the character based on a voice of the first user in a second track so that the temporal voice may be replayed with the action data and the temporal voice is editable; and
  transmitting the first and second track to a second user terminal, and the second user terminal executing steps of:
recording a voice of the character based on a voice of a second user while replaying the temporal voice in the second track.

2. The method according to claim 1, the method further comprising sharing the first track or the second track at a plurality of user terminals.

* * * * *